(12) United States Patent
Goswami

(10) Patent No.: US 10,496,728 B2
(45) Date of Patent: *Dec. 3, 2019

(54) CONFIGURABLE FFT ARCHITECTURE

(71) Applicant: Imagination Technologies Limited, Kings Langley (GB)

(72) Inventor: Debashis Goswami, Bangalore (IN)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/236,872

(22) Filed: Dec. 31, 2018

(65) Prior Publication Data

US 2019/0243868 A1    Aug. 8, 2019

Related U.S. Application Data

(63) Continuation of application No. 15/372,881, filed on Dec. 8, 2016, now Pat. No. 10,169,294.

(30) Foreign Application Priority Data

Dec. 9, 2015    (GB) .................................... 1521656.7

(51) Int. Cl.
*G06F 17/14* (2006.01)
(52) U.S. Cl.
CPC ................... *G06F 17/142* (2013.01)
(58) Field of Classification Search
CPC .................................................... G06F 17/142
USPC ......................................................... 708/404
See application file for complete search history.

(56) References Cited

U.S. PATENT DOCUMENTS

| | | | |
|---|---|---|---|
| 5,293,330 A | 3/1994 | Sayegh | |
| 6,003,056 A | 12/1999 | Auslander et al. | |
| 6,658,441 B1 | 12/2003 | Kim | |
| 2003/0074383 A1 | 4/2003 | Murphy | |
| 2005/0114420 A1* | 5/2005 | Gibb | G06F 17/142 708/404 |
| 2005/0114421 A1* | 5/2005 | Gibb | G06F 17/142 708/404 |
| 2008/0320069 A1 | 12/2008 | Lin et al. | |
| 2009/0013021 A1 | 1/2009 | Jhang et al. | |
| 2011/0164490 A1 | 7/2011 | Hwang | |

(Continued)

OTHER PUBLICATIONS

Garrido et al., "Pipelined Radix-2k Feedforward FFT Architectures," IEEE Transactions on Very Large Scale Integration (VLSI) Systems, vol. 21, No. 1, Jan. 2013, pp. 23-32.

(Continued)

*Primary Examiner* — Tan V Mai
(74) *Attorney, Agent, or Firm* — Vorys, Sater, Seymour and Pease LLP; Vincent M DeLuca

(57) ABSTRACT

A device for performing a Fast Fourier Transform (FFT) on an input dataset includes an FFT pipeline having a first stage configured to receive the input dataset, a plurality of intermediate stages and a final stage, each stage having a stage input; a computational element; and a stage output; a controller configured to select a size for the FFT; and a multiplexer configured to: receive data output from one of the intermediate stages and data output from the final stage; select one of the received outputs in dependence on the selected FFT size; and output said selection as a result of the FFT on the input dataset.

20 Claims, 6 Drawing Sheets

(56) References Cited

U.S. PATENT DOCUMENTS

2014/0365547 A1 12/2014 Kim et al.
2017/0149589 A1* 5/2017 Kim .................... H04L 27/265

OTHER PUBLICATIONS

Lu et al., "A Low-power Variable-length FFT Processor Base on Radix-24 Algorithm," 2009 Asia Pacific Conference on Postgraduate Research in Microelectronics & Electronics (PrimeAsia), pp. 129-132.
Wang et al., "An Area-Efficient Design of Variable-Length Fast Fourier Transform Processor," Journal of Signal Processing Systems, 51, pp. 245-256, Mar. 2007.
(*Note*—NPL in parent application).

* cited by examiner

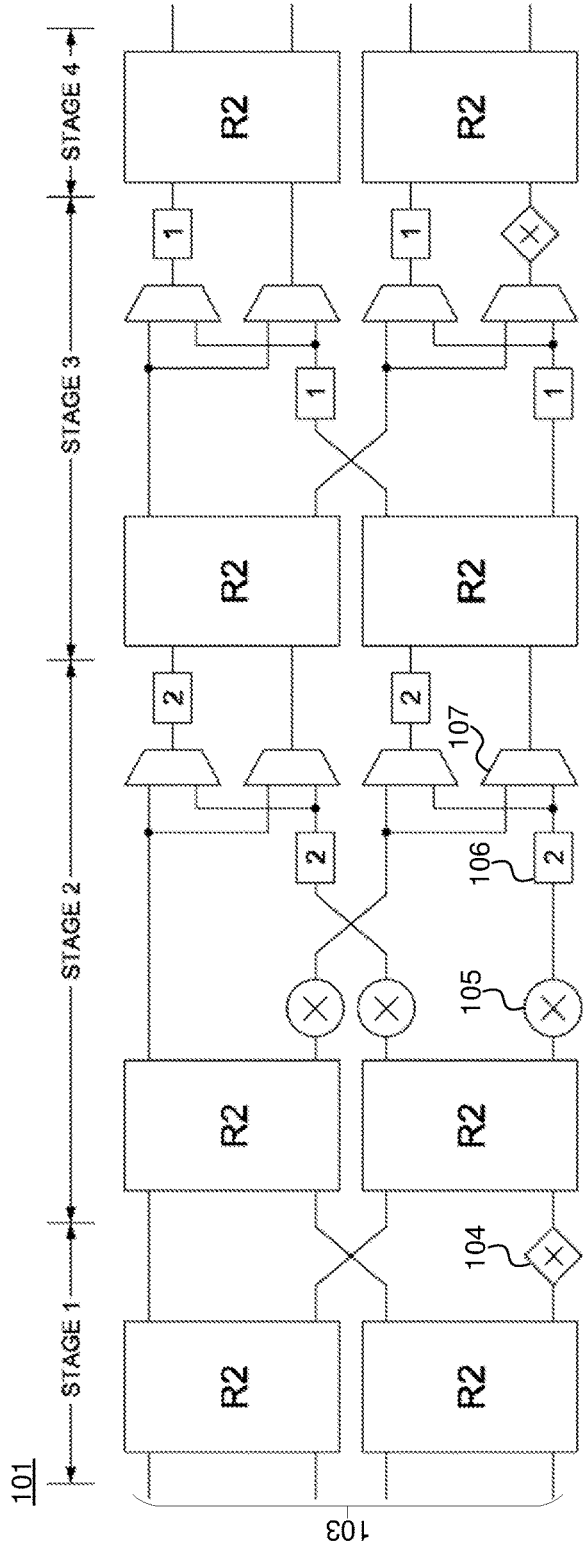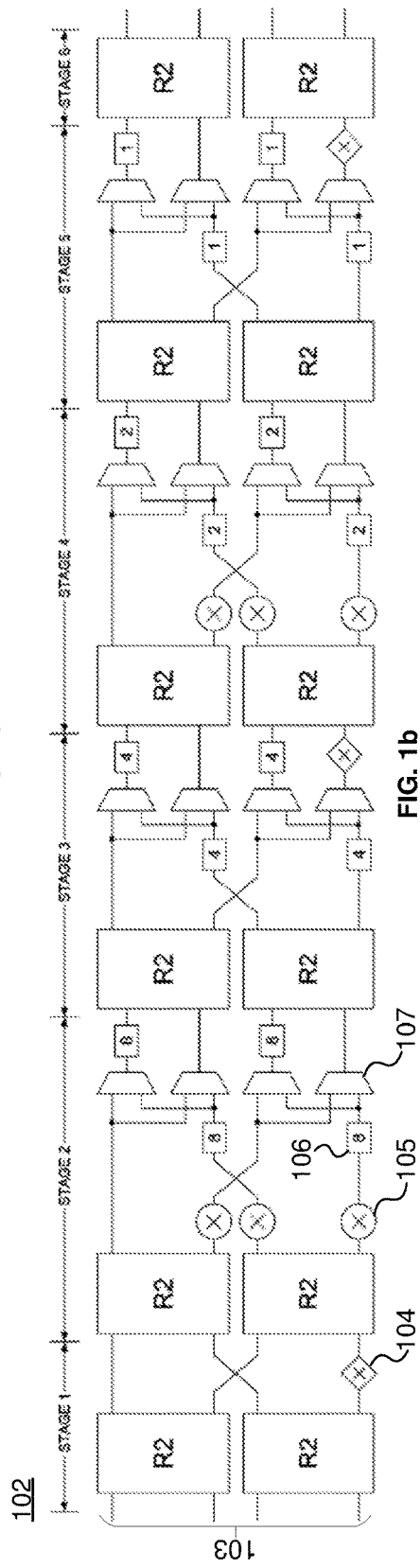
FIG. 1a
FIG. 1b

CONFIGURABLE FFT ARCHITECTURE

BACKGROUND OF THE INVENTION

This invention relates to devices and methods for performing a fast Fourier transform.

The fast Fourier transform (FFT) is an important algorithm in the field of signal processing. It is used to calculate the discrete Fourier transform (DFT) efficiently. In order to meet high performance and real-time requirements of modern applications, hardware designers have tried to implement efficient architectures for the computation of the FFT. In this context, pipelined hardware architectures have been used because they provide high throughputs and low latencies suitable for real-time applications.

There are two main types of pipelined architectures: feedback and feedforward. Feedback architectures have feedback loops where some outputs of the butterfly computation at a stage in the pipeline is fed back to the input of the same stage. In feedforward architectures a continuous flow of samples is processed through the stages in the pipeline. Each stage in the pipeline passes the processed data on to the next stage. Both the feedback and feedforward architectures may also be capable of processing more than one sample in parallel.

In current real-time applications, the FFT has to be calculated at very high throughput rates, e.g. in the range of GSamples/s. These high-performance requirements appear in applications such as Orthogonal Frequency Division Multiplexing (OFDM) and Ultra Wideband (UWB). In this context a number of challenges exist. For example, the FFT of multiple independent data sequences may need to be calculated and each data sequence may have several samples which are received in parallel. This may require parallel feedback or feedforward pipelined architectures which can manage several samples in parallel and provide improvements in throughput.

Hardware engineers often design FFT pipelines based on the FFT size requirements of the particular hardware application. Such pipelined architectures work well for a particular FFT size (which is also referred to as "FFT length"). However, if an application requires support for multiple FFT sizes, multiple pipelines are required—one pipeline for each FFT size. Providing multiple pipelines requires greater chip area and increases the cost of the chip. There is, therefore, a need for FFT pipeline architecture which supports multiple FFT sizes and is cost and chip area efficient.

BRIEF SUMMARY OF THE INVENTION

According to a first aspect there is provided a device for performing a Fast Fourier Transform (FFT) on an input dataset, the device comprising:
an FFT pipeline comprising a first stage configured to receive the input dataset, a plurality of intermediate stages and a final stage, each stage comprising: a stage input; a computational element; and a stage output; a controller configured to select a size for the FFT; and a multiplexer configured to: receive data output from one of the intermediate stages and data output from the final stage; select one of the received outputs in dependence on the selected FFT size; and output said selection as a result of the FFT on the input dataset.

The device may further comprise a second multiplexer configured to: receive data output from two of the intermediate stages and select one of those two outputs in dependence the FFT size.

The device may further comprise a multiplier configured to perform multiplication of data at a point in the FFT pipeline, wherein the controller is further configured to select a multiplication factor for performing the multiplication by the multiplier in dependence on the FFT size.

The multiplication factor may be a function of the FFT size.

The device may further comprise a constant multiplier configured to perform multiplication of data at a point in the FFT pipeline, wherein the controller is further configured to select a value from a predefined set of values for performing the multiplication by the constant multiplier, the value being selected in dependence on the FFT size.

The device may further comprise a third multiplexer configured to: receive each value from the predefined set of values; and output the selected value to the constant multiplier.

The device may further comprise a delay element configured to delay the progress of data along the pipeline, wherein the controller is further configured to select the amount of delay to be applied by the delay element in dependence on the FFT size.

The first stage may be further configured to receive a first dataset, wherein the first dataset may be data resulting from computations performed on the input dataset by at least one of the stages in the FFT pipeline.

The device may further comprise a second multiplier configured to multiply data output from one of the intermediate or final stages so as to generate the first dataset, wherein the controller is further configured to select a second multiplication factor for performing the multiplication by the second multiplier in dependence on the FFT size.

The second multiplication factor may be a function of the FFT size.

The device may further comprise an input multiplexer configured to: receive the input dataset and the first dataset; select one of the input or first datasets; and output said selection to the first stage of the FFT pipeline.

The FFT pipeline may be configured to process, in parallel, P number of input data samples from the input dataset, wherein P is greater than 1.

The FFT pipeline may comprises P parallel processing lines for processing the input data samples from the first stage to the final stage via the intermediate stages, each processing line may comprise a multiplexer configured to: receive the output from one of the intermediate stages and the output from the final stage for that processing line; select one of the received outputs in dependence on the FFT size; and output said selection as the result of processing for that processing line.

The FFT pipeline may be configurable via the multiplexer such that FFTs of different sizes are capable of being processed at the device.

The multiplexer may be arranged such that at least one of the computational elements in the pipeline is capable of being bypassed along the pipeline.

Each computational element may be configured to perform a butterfly calculation.

The device may be embodied in hardware on an integrated circuit.

According to a second aspect there is provided a method of performing a Fast Fourier Transform (FFT) on an input dataset, the method comprising: selecting a size for the FFT; receiving an input dataset at a first stage of a FFT pipeline, wherein the FFT pipeline comprises the first stage, a plurality of intermediate stages and a final stage, each stage comprising: a stage input; a computational element; and a stage output; receiving data output from one of the intermediate stages and data output from the final stage at a multiplexer; selecting one of the received outputs in dependence on the selected FFT size; and outputting said selection as a result of the FFT on the input dataset.

The method may further comprise: at a second multiplexer, receiving the output from two of the intermediate stages and selecting one of those two outputs in dependence the FFT size.

The method may further comprise: selecting a multiplication factor for performing multiplication in dependence on the FFT size; and multiplying data at a point in the FFT pipeline by the selected multiplication factor.

The multiplication factor may be a function of the FFT size.

The method may further comprise: selecting a value from a predefined set of values for performing multiplication, the selection being dependent on the FFT size; and multiplying data at a point in the FFT pipeline by the selected value.

The method may further comprise, at a third multiplexer: receiving each value from the predefined set of values; and outputting the selected value to a multiplier.

The method may further comprise: selecting an amount of delay in dependence on the FFT size; and delaying the progress of data along the pipeline by the selected amount of delay.

The method may further comprise receiving a first dataset, wherein the first dataset is data resulting from computations performed on the input dataset by at least one of the stages in the FFT pipeline.

The method may further comprise: selecting a second multiplication factor in dependence on the FFT size; and generating the first dataset by multiplying the output of one of the intermediate or final stages by the second multiplication factor.

The second multiplication factor may be a function of the FFT size.

The method may further comprise: receiving the input dataset and the first dataset; selecting one of the input or first datasets; and outputting said selection to the first stage of the FFT pipeline.

The method may further comprise processing, in parallel, P number of input data samples from the input dataset, wherein P is greater than 1.

The FFT pipeline may comprise P parallel processing lines for processing the input data samples from the first stage to the final stage via the intermediate stages, the method comprising, at each processing line: receiving data output from one of the intermediate stages and data output from the final stage for that processing line; selecting one of the received outputs in dependence on the FFT size; and outputting said selection as the result of processing for that processing line.

The FFT pipeline may be configurable via the multiplexer such that FFTs of different sizes are capable of being processed at the device.

The method may comprise bypassing at least one of the computational elements along the pipeline.

The method may comprise performing a butterfly calculation by at least one of the computational elements.

According to a third aspect there is provided a method of manufacturing, at an integrated circuit manufacturing system, the device described above.

According to a fourth aspect there is provided an integrated circuit definition dataset that, when processed in an integrated circuit manufacturing system, configures the system to manufacture the device described above.

According to a fifth aspect there is provided a non-transitory computer readable storage medium having stored thereon an integrated circuit definition dataset that, when processed in an integrated circuit manufacturing system, configures the system to manufacture the device described above.

According to a sixth aspect there is provided an integrated circuit manufacturing system comprising: a non-transitory computer readable storage medium having stored thereon an integrated circuit definition dataset defining the device described above; a layout processing system configured to process the integrated circuit definition dataset so as to generate a manufacturing definition of an integrated circuit embodying the device described above; and an integrated circuit generation system configured to manufacture the device according to the manufacturing definition.

According to a seventh aspect there is provided computer program code for performing the method as described above.

According to an eighth aspect there is provided a non-transitory computer readable storage medium having stored thereon computer readable instructions that, when executed at a computer system, cause the computer system to perform the method as described above.

BRIEF DESCRIPTION OF THE DRAWINGS

The present invention will now be described by way of example with reference to the accompanying drawings. In the drawings:

FIG. 1a shows a conventional 4-parallel radix-2 feedforward pipeline which provides an FFT size of 16;

FIG. 1b shows a conventional 4-parallel radix-2 feedforward pipeline which provides an FFT size of 64;

DETAILED DESCRIPTION OF THE INVENTION

Figure 2A:
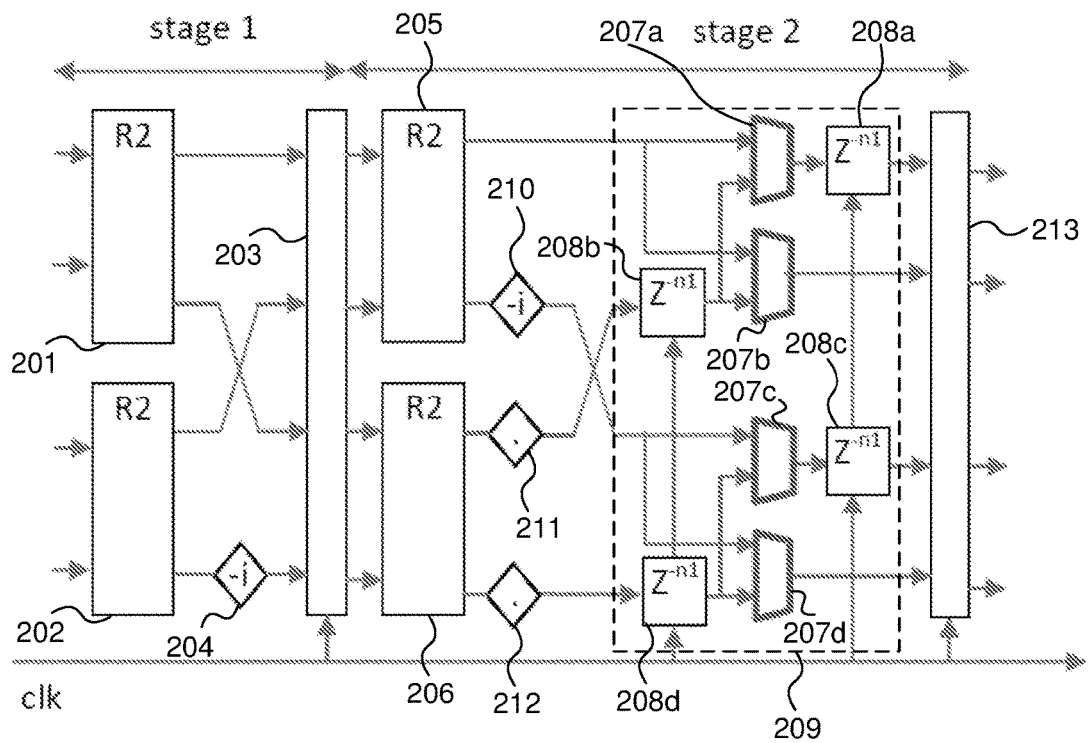
FIGS. 2a-d show an example of a configurable FFT pipeline.

The following description is presented by way of example to enable a person skilled in the art to make and use the invention. The present invention is not limited to the embodiments described herein and various modifications to the disclosed embodiments will be apparent to those skilled in the art.

As mentioned above, conventionally, the architecture of a FFT pipeline will depend on the required FFT size. FIG. 1a shows an example of a conventional 4-parallel radix-$2^2$ feedforward architecture 101 for the computation of a FFT with a size of 16 and FIG. 1b shows and example of a conventional 4-parallel radix-$2^2$ feedforward architecture 102 for the computation of a FFT with a size of 64.

Pipelines 101 and 102 process four samples in parallel in a continuous flow. Four samples are provided in parallel at the start of the pipelines 101 and 102 at input 103. As shown, pipeline 101 has four stages and pipeline 102 has six stages. Each stage comprises a computational element for performing a Fourier transform operation. In FIGS. 1a and 1b, the computational element for performing the Fourier transform operation is a Radix-2 butterfly (R2). The R2 block may perform a butterfly operation in accordance with the Cooley-Turkey FFT algorithm. The pipelines 101 and 102 also comprise other computational elements such as a simple constant multipliers 104 and complex multipliers 105. Data shuffling structures which comprise delay elements 106 and multiplexers 107 are also provided. In FIGS. 1a and 1b, the length of the delay buffers 106 is indicated by the number in each buffer 106.

A memory (not shown) may store a dataset containing samples that the FFT is to be performed on. The samples are provided to the input 103 of pipelines 101 and 102.

The samples flow from left to right along the pipelines 101 and 102. A first subset of four samples are received in parallel at input 103 of each pipeline 101 and 102 at a first clock cycle. At the next clock cycle, the butterfly for the samples is computed by the R2 blocks and the next subset of four samples are received at the input 103. The samples are passed along the pipeline at P samples per clock cycle, where P is the number of samples that are processed in parallel (which is P=4 in the case of pipelines 101 and 102). At the end of each pipeline 101 and 102 the processed samples are output to provide the 16- and 64-size FFT datasets respectively. The outputted processed samples may undergo some further processing, such as an appropriate bit reversal permutation operation, to provide the FFT datasets in the correct order. If an application requires FFT sizes of 16 and 64, both pipelines 101 and 102 would have to be provided in the hardware.

In order to support multiple FFT sizes, the present disclosure describes a configurable pipelined FFT architecture. The following examples describe a configurable pipelined FFT architecture for a 4-parallel feedforward pipeline with eight stages. Other types of FFT pipelines (such as feedback pipelined architectures, pipelines which process a different number of P samples per second, pipelines with a different number of stages, etc), would be configurable in a similar manner.

FIGS. 2a-d show an example of a configurable 4-parallel feedforward pipeline with eight stages. Each stage comprises at least one computational element such as a Radix-2 butterfly R2. FIG. 2a shows stages 1 and 2 of the pipeline. The data that is to be transformed is received at the start of stage 1. Four samples of the data are received in parallel at the same time (two samples per R2 block). The samples are processed at the R2 blocks 201 and 202 in stage 1. The processed data is then output to a register 203 which temporarily stores the processed data. As shown in FIG. 2a, stage 1 also comprises a multiplier 204 which multiplies the bottom output from R2 block 202 by −i before being passed on to register 203. The data from stage 1 is temporarily stored at register 203 and then provided to stage 2.

Stage 2 comprises R2 blocks 205 and 206 which receive the output of stage 1 via register 203. The arrows in FIGS. 2a-d illustrate the flow path of data. As illustrated in stage 1, the processed data from the top output of R2 block 201 is provided to the top input of R2 block 205, the processed data from the bottom output of R2 block 201 is provided to the top input of R2 block 206, the processed data from the top output of R2 block 202 is provided to the bottom input of R2 block 205 and the processed data from the bottom output of R2 block 202 that is multiplied by −i is provided to the bottom input of R2 block 206. The received data is processed by R2 blocks 205 and 206. Stage 2 comprises a data shuffling structure 209 for providing data to the appropriate inputs at stage 3 (via register 213) at the appropriate times. The data shuffler comprises multiplexers 207a-d and configurable delay elements 208a-d (which are discussed further below). As illustrated, the processed data from the top output of R2 block 205 is provided to an input of multiplexer 207a and multiplexer 207b. The processed data from the bottom output of R2 block 205 is multiplied by −i at multiplier 210 and provided to an input of multiplexer 207c and multiplexer 207d. The processed data from the top output of R2 block 206 is multiplied by a configurable constant multiplier 211 and the bottom output of R2 block 206 is multiplied by a configurable constant multiplier 212. The operation of the configurable constant multipliers 211 and 212 is described further below. The data multiplied by multiplier 211 is provided to configurable delay element 208b and the data multiplied by multiplier 212 is provided to configurable delay element 208d. The data outputted by the data shuffler 209 is provided to register 213, which provides that data to the input of stage 3.

Figure 2B:
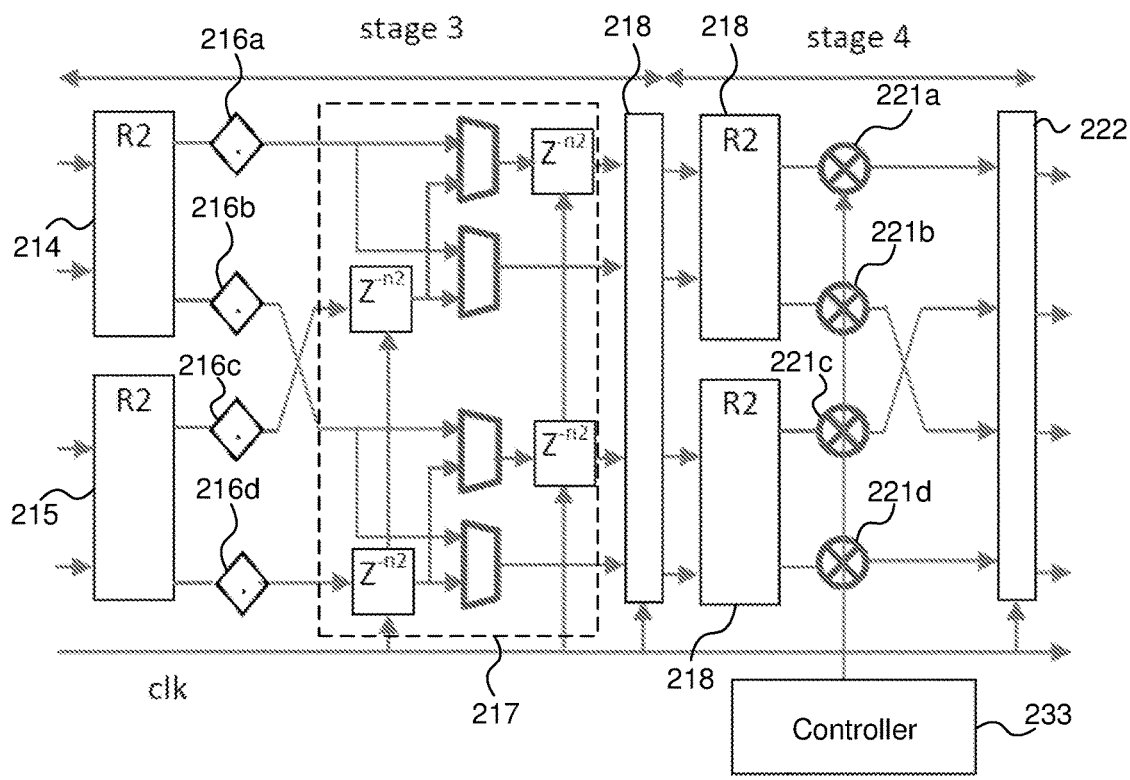

FIG. 2b shows stages 3 and 4 of the pipeline. Stage 3 receives data from stage 2 at R2 blocks 214 and 215. The received data is processed and output to configurable constant multipliers 216a-d. As shown in the figure, the multiplied data is provided to a data shuffler 217, which outputs the shuffled data to register 218. The data stored at the register 218 is provided to stage 4. The data received at stage 4 is processed by R2 blocks 219 and 220 and output to configurable complex multipliers 221a-d, which multiplies the processed data by a determined multiplication factor and provides the multiplied data to register 222. The operation of the configurable complex multipliers 221a-d is described in further detail below.

Figure 2C:
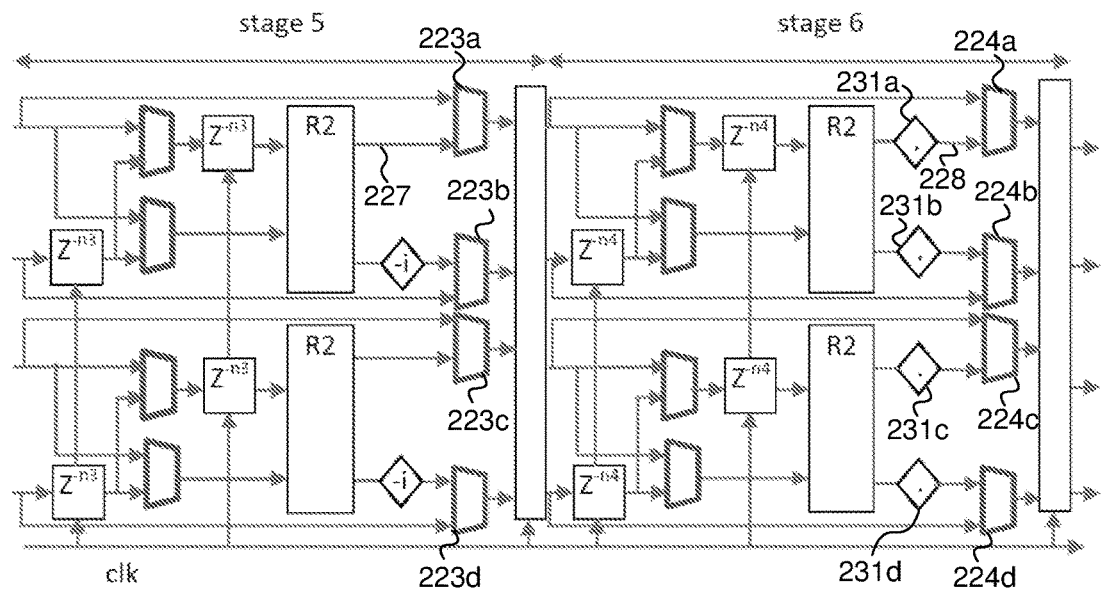
Figure 2D:
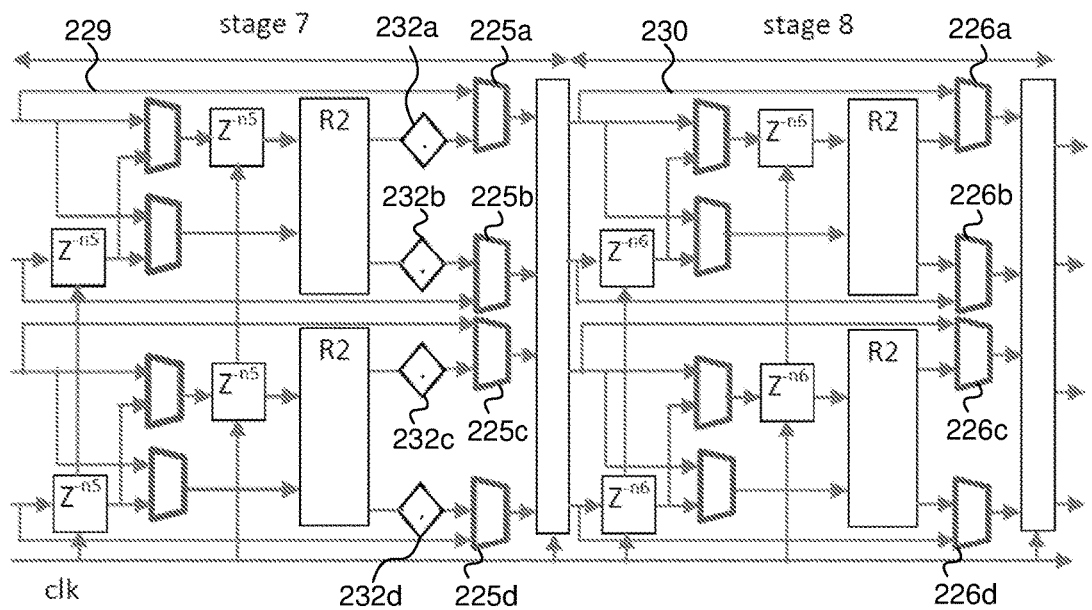

FIG. 2c shows stages 5 and 6 and FIG. 2d shows stages 7 and 8. As shown in FIGS. 2c and 2d, stages 5 to 8 comprise bypass multiplexers 223a-d, 224a-d, 225a-d and 226a-d. The bypass multiplexers for each stage each receive a first line for receiving data output from the preceding stage and a second line for receiving data that is processed at that stage. The bypass multiplexers can select appropriate lines so that the output data from any one of stages 4-7 is capable of bypassing the processing carried out at subsequent stage(s) so that the output data from any one of stages 4-7 can be outputted at the end of the pipeline (i.e. at the output of stage 8). Thus the data output at the end of the pipeline may not be processed at one or more of stages 5 to 8. This allows the pipeline to be configurable so that FFTs of different sizes can be obtained from the same pipeline. For example, table 1 indicates which stages are bypassed in order to obtain a required FFT size.

TABLE 1

| FFT size | Bypass stage 5 | Bypass stage 6 | Bypass stage 7 | Bypass stage 8 |
|---|---|---|---|---|
| 16 | Yes | Yes | Yes | Yes |
| 32 | No | Yes | Yes | Yes |
| 64 | No | No | Yes | Yes |
| 128 | No | No | No | Yes |
| 256 | No | No | No | No |

For example, if a FFT size of 16 is required, stages 5 to 8 are required to be bypassed (see table 1). The bypass multiplexers 223a-d, 224a-d, 225a-d and 226a-d at each stage 5 to 8 would be set so that the data received from the preceding stage is directly output by that stage (i.e. the data output by each bypassed stage is the same as the data it receives). Thus, when a stage is bypassed, the data received by that stage does not undergo any processing by any R2 blocks, multipliers or data shufflers.

If, for example, a FFT size of 64 is required, stages 7 and 8 are bypassed (see table 1). The bypass multiplexers 223a-d and 224a-d at stages 5 and 6 would be set so that they select the lines that provides data that has been processed at those stages. For example, bypass multiplexers 223a and 224a would select lines 227 and 228 respectively so that data processed by the top parallel processing lines of stages 5 and 6 respectively is passed on to the subsequent stage. Multiplexers 223b-d and 224b-d would be similarly set to pass on data processed at those parallel processing lines. Stages 7 and 8 are to be bypassed and so multiplexers 225a-d and 226a-d are set so that they pass on data that is received at the respective stages and not processed at those stages. For example, multiplexers 225a and 226a would select lines 229 and 230 respectively so that the data received by the top parallel processing line at stages 7 and 8 respectively is directly output by those stages. Similarly, multiplexers 225b-d and 226b-d would be set to select the lines that directly receives data from the preceding stage for the other parallel processing lines. Data for the 64-sized FFT is then obtained at the output of stage 8.

The FFT of the required size is obtained at the output of stage 8 after an appropriate bit reversal permutation operation that re-orders the data to generate the correct ordered FFT output dataset The line selections made by each of the bypass multiplexers 223a-d, 224a-d, 225a-d and 226a-d may be set by a controller 233 (the connections between the multiplexers and controller 233 are not shown in the figures). The controller may determine which FFT size is required and then set each of the bypass multiplexers in accordance with the determined FFT size so that the appropriate stages are bypassed (as described in table 1).

Each stage of the pipelines described herein comprise at least one element that is capable of performing some computation (e.g. multiplication, butterfly calculation, etc) on data received at the stage. As mentioned above, the computation elements at each stage may be bypassed using the bypass multiplexers depending on the required FFT size. Thus, the output of a stage may be data that results from some computation performed at that stage or data that has not had any computation performed on it at that stage.

In an alternative arrangement, the output of the pipeline may not be at the end of stage 8 and the bypass multiplexers may be replaced by a single multiplexer per parallel processing line which taps the output of each parallel processing line from each stage 4 to 8 and selects the appropriate tap depending on the desired FFT size. The output for the pipeline would be the output from each multiplexer. For example, in the 4-parallel system described in FIGS. 2a-d, a 5:1 multiplexer would be provided per parallel processing line, and each 5:1 multiplexer would receive the tapped data output from stages 4, 5, 6, 7 and 8 (i.e. five taps) for its parallel processing line. The multiplexers would then select a tapped output depending on the required FFT size. For example, if the required FFT size is 32, each of the four multiplexers would select the tapped output from stage 5 and those selected outputs would provide the resulting transformed FFT data with a size of 32.

As mentioned above, stage 4 comprises configurable complex multipliers 221a-d. These multipliers are configurable so that that multiply data by a factor that is dependent on the required FFT size. The controller 233 may determine a multiplication factor for each of the multipliers 221a-d in dependence on the required FFT size and accordingly set the multiplication factor for each of the multipliers 221a-d. The multiplication factor may be a twiddle factor. The twiddle factor is a function of the FFT size. The twiddle factor $w_L$ may be defined as:

$$w_L = \exp(-i*((2*pi/L)*[0:(L-1)]))$$

where L is the FFT size and the twiddle factor $w_L$ is a function of L.

The elements of $w_L$ are fed to the stage 4 multipliers 221a-d as below. Each multiplier operates for L/4 cycles. Each stage processes L data from 4 parallel multipliers.
221a=[ones(1:L/16), $w_L(2*[0:(L/16-1)]+1)$, $w_L(1*[0:(L/16-1)]+1)$, $w_L(3*[0:(L/16-1)]+1)$];
221b=[$w_L(8*[0:(L/16-1)]+1)$, $w_L(10*[0:(L/16-1)]+1)$, $w_L(9*[0:(L/16-1)]+1)$, $w_L(11*[0:(L/16-1)]+1)$];
221c=[$w_L(4*[0:(L/16-1)]+1)$, $w_L(6*[0:(L/16-1)]+1)$, $w_L(5*[0:(L/16-1)]+1)$, $w_L(7*[0:(L/16-1)]+1)$];
221d=[$w_L(12*[0:(L/16-1)]+1)$, $w_L(14*[0:(L/16-1)]+1)$, $w_L(13*[0:(L/16-1)]+1)$, $w_L(15*[0:(L/16-1)]+1)$];

Each of the above equations is an array of length L/4, and is fed to the respective multiplier for L/4 cycles. As an example, for L=64, 221a is an array of length 16 and the first 4 values are [1, 1, 1, 1]. The above equations are a compact representation (typically used in applications such as Matlab) of an array, where f(1:N) is an array of N elements.

As shown in FIGS. 2a-d, the pipeline comprises configurable constant multipliers 211 and 212 at stage 2, configurable constant multipliers 216a-d at stage 3, configurable constant multipliers 231a-d at stage 6 and configurable constant multipliers 232a-d at stage 7. The multiplication factors (or twiddle factors) for these multipliers are constants and thus may be precomputed and stored in hardware. A different constant may be required depending on the FFT size. The inventors have found that only six unique constants need to be precomputed and stored in order to serve the 16 to 256 FFT sizes. Table 2 shows the six unique twiddle factors.

TABLE 2

| Twiddle | Real Integer | Real Hex | Imag integer | Imag Hex |
|---|---|---|---|---|
| w16(2) | 7568 | 0x1D90 | −3135 | 0x33C1 |
| w16(3) | 5793 | 0x16A1 | −5793 | 0x295F |
| w16(4) | 3135 | 0x0C3F | −7568 | 0x2270 |
| w16(6) | −3135 | 0x33C1 | −7568 | 0x2270 |
| w16(7) | −5793 | 0x295F | −5793 | 0x295F |
| w16(8) | −7568 | 0x2270 | −3135 | 0x33C1 |

Table 3 indicates the twiddle factors that may be used by the each of the configurable constant multipliers.

TABLE 3

| Configurable constant multiplier | Twiddle factor |
|---|---|
| 211 (stage 2) | $w_{16}(3)$ |
| 212 (stage 2) | $w_{16}(7)$ |
| 216a (stage 3) | $w_{16}(2)$ |
| 216b (stage 3) | $w_{16}(6)$ |
| 216c (stage 3) | $w_{16}(3)$ or $w_{16}(4)$ |
| 216d (stage 3) | $w_{16}(7)$ or $w_{16}(8)$ |
| 231a (stage 6) | $w_{16}(3)$ |
| 231b (stage 6) | $w_{16}(7)$ |
| 231c (stage 6) | $w_{16}(3)$ |
| 231d (stage 6) | $w_{16}(7)$ |
| 232a (stage 7) | $w_{16}(2)$ or $w_{16}(3)$ or $w_{16}(4)$ |
| 232b (stage 7) | $w_{16}(6)$ or $w_{16}(7)$ or $w_{16}(8)$ |
| 232c (stage 7) | $w_{16}(2)$ or $w_{16}(3)$ or $w_{16}(4)$ |
| 232d (stage 7) | $w_{16}(6)$ or $w_{16}(7)$ or $w_{16}(8)$ |

For configurable constant multipliers 216c-d and 232a-d, the twiddle factor may be selected in dependence on the FFT size. The controller may select, via one or more multiplexers (not shown), the appropriate twiddle factor for those multipliers. The twiddle factors selected for the configurable constant multipliers may depend on the twiddle factor calculated for the multipliers 221a-d described above. Since there are only six twiddle factors required to be stored, minimal hardware storage is required.

As mentioned above, the delay elements of the data shufflers in the pipeline may be configurable depending on the FFT size. The amount of delay that is applied at each of the delay elements may be set by the controller (connection not shown), which selects the amount of delay based on the FFT size. Table 4 indicates the amount of delay (in clock cycles) that may be applied at each of the configurable delay elements at each stage depending on the required FFT size.

TABLE 4

| FFT size | Stage 2 | Stage 3 | Stage 5 | Stage 6 | Stage 7 | Stage 8 |
|---|---|---|---|---|---|---|
| 16  | 2  | 1  | 1 | 1 | 1 | 1 |
| 32  | 4  | 2  | 1 | 1 | 1 | 1 |
| 64  | 8  | 4  | 2 | 1 | 1 | 1 |
| 128 | 16 | 8  | 4 | 2 | 1 | 1 |
| 256 | 32 | 16 | 8 | 4 | 2 | 1 |

The configurable FFT pipeline may be operated in a two-pass mode so that FFTs of greater sizes are possible. For example, the eight stage pipeline shown in FIGS. 2a-d may be operated in a two-pass mode to provide FFT sizes of up to 64K. Table 5 shows the FFT sizes that are possible with the configurable eight stage FFT pipeline operating in one-pass and two-pass modes.

TABLE 5

| FFT size (L = L_RAD1 * L_RAD2) | Number of passes | First pass FFT size (L_RAD1) | Second pass FFT size (L_RAD2) | Number of clock cycles |
|---|---|---|---|---|
| 16    | 1 | 16  | n/a | 4 |
| 32    | 1 | 32  | n/a | 8 |
| 64    | 1 | 64  | n/a | 16 |
| 128   | 1 | 128 | n/a | 32 |
| 256   | 1 | 256 | n/a | 64 |
| 512   | 2 | 32  | 16  | 256 |
| 1024  | 2 | 64  | 16  | 512 |
| 2048  | 2 | 128 | 16  | 1024 |
| 4096  | 2 | 256 | 16  | 2048 |
| 8192  | 2 | 128 | 64  | 4096 |
| 16384 | 2 | 256 | 64  | 8192 |
| 32768 | 2 | 256 | 128 | 16384 |
| 65536 | 2 | 256 | 256 | 32768 |

Figure 3:
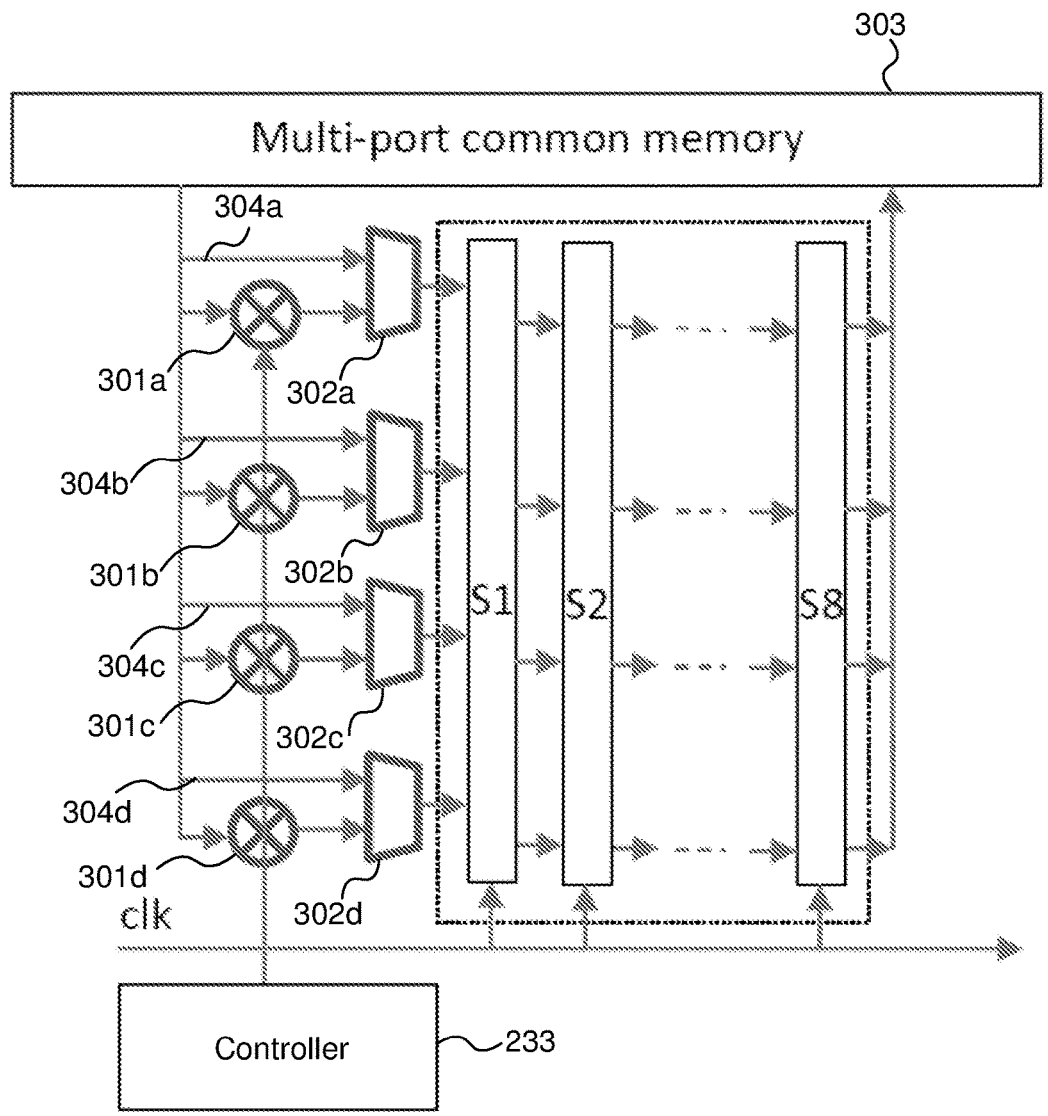
FIG. 3 shows an example of an enhanced configurable FFT pipeline.

As shown in FIG. 3, to implement the two pass operation, a pre-multiplication stage may be required by using another set of four configurable complex multipliers 301a-d which provide appropriate twiddle factor multiplication. The controller 233 may determine the twiddle factor for each complex multiplier 301a-d in dependence on the required FFT size. The controller 233 may then set each multiplier 301a-d to perform multiplication by the determined twiddle factor. The eight pipelined stages are numbered as S1 to S8 in FIG. 3. The pre-multiplication is required only for the second pass, and is bypassed in the first pass. The first pass or second pass input may be selected using multiplexers 302a-d. For example, when the pipeline of FIG. 3 is operating in the two-mode to provide an FFT size of 2048, samples of the data to be transformed is first provided from memory 303 to the input of the pipeline via the multiplexers 302a-d selecting lines 304a-d to bypass the multipliers 301a-d. As shown in table 5, for a total FFT size of 2048, the first pass FFT size is 128. Thus, the controller 233 sets the configurable elements in the pipeline (such as the bypass multiplexers, configurable multipliers, configurable delay elements, etc) to provide an FFT size of 128 for the first pass (which requires stage 8 to be bypassed, as indicated in table 1). The resulting data for the first pass is stored in memory 303. The data from the first pass is then read out from memory 303 so that it is provided to the pipeline for the second pass. For the second pass, the controller 233 sets the multiplexers 302a-d to select the input line comprising multipliers 301a-d so that the data from the first pass is multiplied by the appropriate twiddle factors before being inputted at the pipeline. The controller 233 sets the configurable elements in the pipeline to provide an FFT size of 16 for the second pass (as indicated in table 5). Thus, stages 5 to 8 are bypassed for the second pass. The data output from the second pass provides the 2048-sized FFT.

The two-pass twiddle factors may be generated from an array of 65536 twiddle factors.

The array may be defined as:

$$w_{65k} = \exp(-i*(2*pi/65536)*[0:65535]));$$

The elements of $w_{65k}$ are fed to the pre-multipliers 301a-d as follows:

M=SEQ*65536/L, where SEQ is a variable that would increment for every FFT in sequence [1, 2, 3, . . . L_RAD1] for pass two.

301a=[$w_{65k}$(1: M: M*L_RAD2/4)];
301b=[$w_{65k}$(M*L_RAD2/2+[1: M: M*L_RAD2/4])];
301c=[$w_{65k}$(M*L_RAD2/4+[1: M: M*L_RAD2/4])];
301d=[$w_{65k}$(3*M*L_RAD2/4+[1: M: M*L_RAD2/4])].

Figure 4:
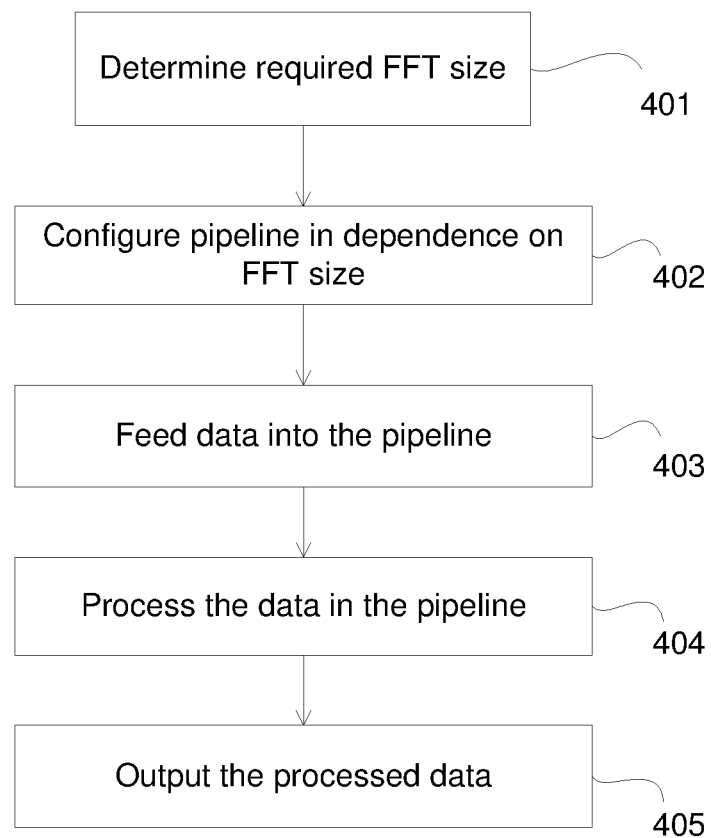
FIG. 4 illustrates a process for processing data at a configurable FFT pipeline.

FIG. 4 shows a flow diagram which illustrates the process for performing a FFT of a dataset at a configurable FFT pipeline. At step 401, the FFT size required is determined. This may be determined by the controller (described above), which may receive a request for a performing an FFT at a specified size from an application.

At step 402, the pipeline is configured according to the required FFT size. As described above and depending on the architecture of the FFT pipeline, one or more of the components in the pipeline is set depending on the FFT size. For example, one or more of the multiplexers, configurable multipliers and/or configurable delay buffers may be set according to the required FFT size. For example, the controller may select appropriate input signal lines for the multiplexers, multiplication factors for the multipliers and/or delay lengths for the delay buffers.

At step 403, samples from the dataset to be transformed are fed into the input of the pipeline. The number of samples fed into the pipeline at a cycle will depend on the number of samples the pipeline is capable of processing in parallel.

At step 404, the samples are passed along the pipeline. As mentioned above, the samples are processed at the non-bypassed stages, where the samples undergo some computation (e.g. via R2 blocks and/or multipliers). At step 402, the multiplexers are set so that one or more of the stages are bypassed along the pipeline. Thus, as the samples are passed along the pipeline, processing at one or more of the stages may be bypassed depending on the required FFT size.

At step 405, the processed results are outputted from the pipeline. As mentioned above, processed data may be output at the end of the pipeline (e.g. at the output of stage 8 in FIG. 2d) or by one or more multiplexers which selects the tapped output from the appropriate stage. The outputted data may undergo some further processing in order to obtain the DFT of the input data.

The example pipelines described above relate to a 4-parallel radix-2 feedforward FFT pipeline. However, other types of pipelines may also be configurable in a similar manner. For example, a Single-Path Delay-Feedback (SDF) FFT pipeline may be configurable by providing at least one bypass multiplexer in the pipeline. As a Radix-2 SDT FFT pipeline only has one data path between stages in the pipeline (each R2 block at each stage receives data from a previous stage at one input and other input receives a feedback data line from the output of the same R2 block), only one multiplexer is required to bypass a stage in the pipeline. Alternatively, a single multiplexer may receive a tapped output from each stage in the SDF FFT pipeline and select an appropriate tapped output in dependence on the required FFT size, as described above.

The configurable pipeline architectures described herein allow a single pipeline to support multiple FFT sizes. The example pipeline described above in relation to FIGS. 2a-d is capable of performing FFTs of sizes 16, 32, 64, 128 and 256 when operating in the single-pass mode. When operating in the two-pass mode (as described in relation to FIG. 3), the same pipeline is additionally capable of performing FFTs of sizes 512, 1024, 2048, 4 k, 8 k, 16 k, 32 k and 64 k. Thus, in this example, the same hardware architecture is capable of providing thirteen different FFT sizes. Other numbers of FFT sizes may be provided depending on the number of stages provided in the pipeline. The configurability of the pipeline is achieved with a small number (e.g. only four for the pipeline of FIGS. 2a-d) of full complex multipliers, which are generally expensive in hardware. The other multipliers in the pipeline may be provided by simple constant multipliers, which are simple and cheap to implement in hardware. Compared to conventional FFT pipelines with require a different pipeline for each FFT size, the single configurable FFT pipeline architecture described herein provides a compact and cheap device for carrying out FFTs of multiple sizes.

The devices of FIGS. 1-3 are shown as comprising a number of functional blocks. This is schematic only and is not intended to define a strict division between different logic elements of such entities. Each functional block may be provided in any suitable manner.

Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a FFT device configured to perform any of the methods described herein, or to manufacture a device comprising any apparatus described herein.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a FFT device will now be described with respect to FIG. 5.

Figure 5:
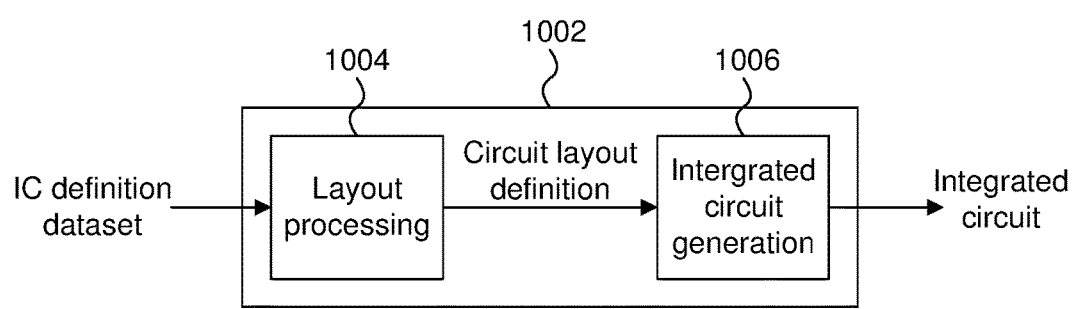
FIG. 5 is a schematic diagram of an integrated circuit manufacturing system.

FIG. 5 shows an example of an integrated circuit (IC) manufacturing system 1002 which comprises a layout processing system 1004 and an integrated circuit generation system 1006. The IC manufacturing system 1002 is configured to receive an IC definition dataset (e.g. defining a FFT device as described in any of the examples herein), process the IC definition dataset, and generate an IC according to the IC definition dataset (e.g. which embodies a FFT device as described in any of the examples herein). The processing of the IC definition dataset configures the IC manufacturing system 1002 to manufacture an integrated circuit embodying a FFT device as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a FFT device without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 5 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 5, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A device for performing a Fast Fourier Transform (FFT) on an input dataset, the device comprising:
   an FFT pipeline comprising a first stage configured to receive the input dataset, a plurality of intermediate stages and a final stage, each stage comprising a computational element;
   a constant multiplier configured to perform multiplication at a point in the FFT pipeline;
   a controller configured to select a size for the FFT and to select a value for performing the multiplication by the constant multiplier in dependence on the FFT size; and
   a multiplexer configured to:
     receive data output from one of the intermediate stages and data output from the final stage,
     select one of the received outputs in dependence on the selected FFT size, and
     output said selection as a result of the FFT on the input dataset.

2. The device as claimed in claim 1, further comprising: a second multiplexer configured to: receive data output from two of the intermediate stages and select one of those two outputs in dependence the FFT size.

3. The device as claimed in claim 1, further comprising a complex multiplier configured to perform multiplication of data at a point in the FFT pipeline, wherein the controller is further configured to select a multiplication factor for performing the multiplication by the complex multiplier in dependence on the FFT size.

4. The device as claimed in claim 3, wherein the multiplication factor selected by the controller for performing the multiplication by the complex multiplier is a function of the FFT size.

5. The device as claimed in claim 1, wherein the controller is configured to select the value for performing the multiplication by the constant multiplier from a precomputed set of values.

6. The device as claimed in claim 5, further comprising a third multiplexer configured to: receive each value from the precomputed set of values; and output the selected value to the constant multiplier.

7. The device as claimed in claim 1, further comprising a delay element configured to delay the progress of data along the pipeline, wherein the controller is further configured to select the amount of delay to be applied by the delay element in dependence on the FFT size.

8. The device as claimed in claim 1, wherein the first stage is further configured to receive a first dataset, wherein the first dataset is data resulting from computations performed on the input dataset in a first pass by at least one of the stages in the FFT pipeline.

9. The device as claimed in claim 8, further comprising a second complex multiplier configured to multiply data resulting from computations performed on the input dataset in the first pass by at least one of the stages in the FFT pipeline so as to generate the first dataset, the first stage being configured to subsequently receive the first dataset for processing in a second pass of the FFT pipeline, wherein the controller is further configured to select a second multiplication factor for performing the multiplication by the second complex multiplier in dependence on the FFT size.

10. The device as claimed in claim 9, wherein the second multiplication factor is a function of the FFT size.

11. The device as claimed in claim 8, wherein the device comprises an input multiplexer configured to: receive the input dataset and the first dataset; select one of the input or first datasets; and output said selection to the first stage of the FFT pipeline.

12. The device as claimed in claim 1, wherein the FFT pipeline is configured to process, in parallel, P number of input data samples from the input dataset, wherein P is greater than 1.

13. The device as claimed in claim 12, wherein the FFT pipeline comprises P parallel processing lines for processing the input data samples from the first stage to the final stage via the intermediate stages, each processing line comprising a multiplexer configured to: receive the output from one of the intermediate stages and the output from the final stage for that processing line; select one of the received outputs in dependence on the FFT size; and output said selection as the result of processing for that processing line.

14. The device as claimed in claim 1, wherein the FFT pipeline is configurable via the multiplexer such that FFTs of different sizes are capable of being processed at the device.

15. The device as claimed in claim 1, wherein the multiplexer is arranged such that at least one of the computational elements in the pipeline is capable of being bypassed along the pipeline.

16. The device as claimed in claim 1, wherein each computational element is configured to perform a butterfly calculation.

17. A method of performing a Fast Fourier Transform (FFT) on an input dataset, the method comprising:
selecting a size for the FFT;
receiving an input dataset at a first stage of a FFT pipeline, wherein the FFT pipeline comprises the first stage, a plurality of intermediate stages and a final stage, each stage comprising a computational element;
selecting a value for performing multiplication, the selection being dependent on the FFT size; and multiplying data at a point in the FFT pipeline by the selected value by a constant multiplier;
receiving data output from one of the intermediate stages and data output from the final stage at a multiplexer;
selecting one of the received outputs in dependence on the selected FFT size; and
outputting said selection as a result of the FFT on the input dataset.

18. The method as claimed in claim 17, wherein the value for performing the multiplication by the constant multiplier is selected from a precomputed set of values.

19. The method as claimed in claim 17, further comprising selecting a multiplication factor for performing multiplication in dependence on the FFT size; and multiplying data at a point in the FFT pipeline by the selected multiplication factor by a complex multiplier.

20. A non-transitory computer readable storage medium having stored thereon an integrated circuit definition dataset that, when processed in an integrated circuit manufacturing system, configures the system to manufacture a device for performing a Fast Fourier Transform (FFT) on an input dataset, the device comprising:
an FFT pipeline comprising a first stage configured to receive the input dataset, a plurality of intermediate stages and a final stage, each stage comprising a computational element;
a constant multiplier configured to perform multiplication of data at a point in the FFT pipeline
a controller configured to select a size for the FFT and to select a value for performing the multiplication by the constant multiplier in dependence on the FFT size; and
a multiplexer configured to:
receive data output from one of the intermediate stages and data output from the final stage,
select one of the received outputs in dependence on the selected FFT size, and
output said selection as a result of the FFT on the input dataset.

* * * * *